United States Patent [19]

Mandelcorn

[11] Patent Number: 5,666,281
[45] Date of Patent: Sep. 9, 1997

[54] BATTERY POLARITY SWITCH FOR APPLYING POWER TO A CO-AXIAL CABLE AND INCORPORATING REGULATION

[75] Inventor: Yehoshua Mandelcorn, Dallas, Tex.

[73] Assignee: Lucent Technologies Inc., Murray Hill, N.J.

[21] Appl. No.: 493,398

[22] Filed: Jun. 22, 1995

[51] Int. Cl.$^6$ .................................................. H02M 7/537
[52] U.S. Cl. ............................ 363/132; 323/271; 363/98
[58] Field of Search ................................. 323/268, 271, 323/272; 363/131, 132, 97, 98

[56] References Cited

U.S. PATENT DOCUMENTS

| | | | |
|---|---|---|---|
| 4,811,192 | 3/1989 | Egawa | 363/132 |
| 4,860,189 | 8/1989 | Hitchcock | 363/132 |
| 5,001,621 | 3/1991 | Zgawa | 363/132 |
| 5,519,306 | 5/1996 | Itoh et al. | 363/132 X |

OTHER PUBLICATIONS

"Power Electronics: Converters, Applications and Design", N. Monahan et al, publisher: John Wiley & Sons, c1989, pp. 115–116.

*Primary Examiner*—Peter S. Wong
*Assistant Examiner*—Y. J. Han
*Attorney, Agent, or Firm*—Alfred G. Steinmetz

[57] ABSTRACT

A switching circuit is provided to process a DC voltage and apply a low frequency AC voltage, having a trapezoidal waveform, to a co-axial cable transmitting the low frequency AC voltage to a load which may be powered by the low frequency AC voltage as well as a DC voltage. In one specific embodiment two of the switches are connected as part of buck regulation circuits to serve a dual purpose of polarity switching and regulation.

8 Claims, 2 Drawing Sheets

5,666,281

BATTERY POLARITY SWITCH FOR APPLYING POWER TO A CO-AXIAL CABLE AND INCORPORATING REGULATION

FIELD OF THE INVENTION

This invention relates to a power train to supply a low frequency AC voltage to a co-axial load. It particularly concerns a switching circuit to convert DC (e.g.,battery) voltage to a low frequency AC voltage and to such a switching circuit providing a regulated low frequency AC voltage with a defined waveform.

BACKGROUND OF THE INVENTION

In some power system loads requiring a DC voltage, the power equipment used therein has operating characteristics that are desirable to avoid, in certain circumstances. An example is the supplying of a DC voltage over a co-axial cable. Corrosion becomes a serious problem if the co-axial cable is damaged however so slightly.

Corrosion can be substantially eliminated by converting the DC voltage to an AC voltage, however the requirement of the provision of a DC voltage places strict limits upon this option.

DC voltage equipment can, in many instances be powered by an extremely low frequency AC voltage. The provision of a low frequency AC voltage by inverter circuits is not economically and technically efficient in many applications, however, because of the size and expense of the magnetics required at low frequency.

A voltage polarity switch, of the prior art, is configured as a bridge circuit in the schematic of FIG. 3. In this particular arrangement all of the illustrated FET switches $Q_1$, $Q_2$, $Q_3$ and $Q_4$ are driven by a PWM signal which is divided into PHASE-A and PHASE-B PWM series of pulses. This particular circuit is most profitably used with the generation of low frequency voltages with a substantially sinusoidal waveform. A sinusoidal waveform is not very suitable for powering DC voltage equipment with a low frequency AC voltage. Such a circuit is disclosed in "Power Electronics, Converters, Applications, and Design" by Ned Mohan et al, Wiley, c1989 pg. 115, 116.

SUMMARY OF THE INVENTION

Therefore in accordance with the invention, a polarity switch is provided to process a DC voltage into a very low frequency AC voltage with a trapezoidal waveform, as described in the claims.

In an illustrative embodiment described, a switching circuit is provided to process a DC voltage and apply a regulated low frequency AC voltage, having a trapezoidal waveform, to a co-axial cable which is transmitting the low frequency AC voltage to a load which may be powered by the low frequency AC voltage as well as a DC voltage. Two of four of the switches are connected as part of buck regulation circuits to serve a dual purpose of polarity switching and regulation. All switches, of the polarity switching circuit are paired and connected to alternately connect a DC voltage polarity to a co-axial cable.

DETAILED DESCRIPTION

Figure 1:
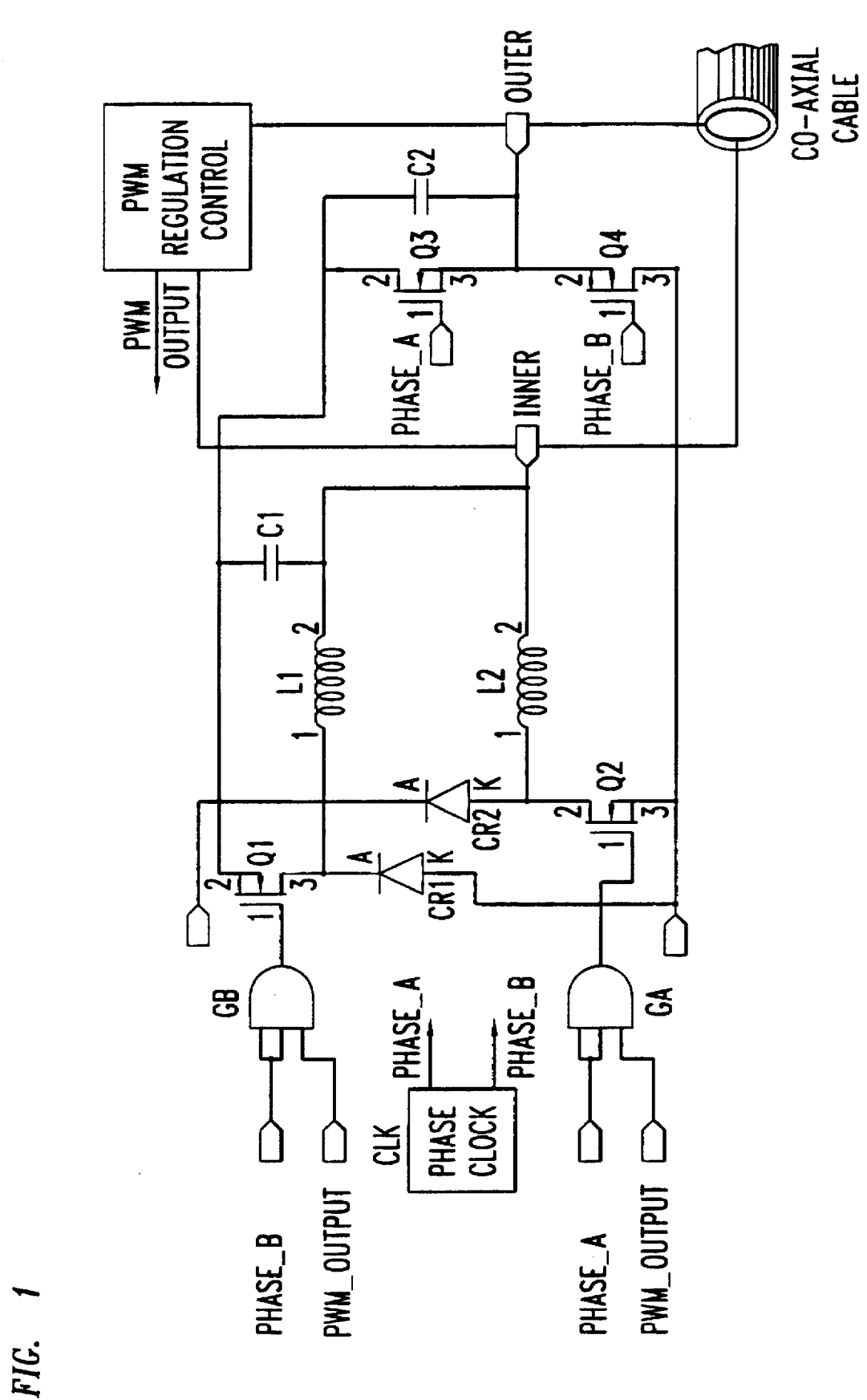
FIG. 1 is a schematic of a H bridge polarity switch with dual use switches.

A polarity switch, as shown in the FIG. 1, includes four FET power switches $Q_1$, $Q_2$, $Q_3$ and $Q_4$ connected into a power train in the form of an H bridge connection. Positive and negative polarities of a DC voltage are accepted at the input terminals designated $V_{DC}+$ and $V_{DC}-$. $V_{DC}+$ is connected to the drains of $Q_1$ and $Q_3$, respectively. $V_{DC}-$ is connected to the source of $Q_2$ and to the source of $Q_4$. The source of $Q_1$ is clamped to $V_{DC}-$ by the diode CR1 and the drain of $Q_2$ is clamped to $V_{DC}+$ by the diode CR2. The two polarity switches $Q_1$ and $Q_2$ are isolated from one another by the two inductors $L_1$ and $L_2$ so that any overlap in conduction between the two polarity switches, during a phase/switching state transition, is not destructive to the polarity switches.

A phase clock CLK generates alternate phases A and B which are applied, via the PHASE-A and the PHASE-B terminals to the gate terminals of the polarity switches $Q_3$ and $Q_4$ enabling these switches to alternately conducting to one. The alternate phases A and B are also applied to the gate circuits GA and GB respectively. The A and B phase signals enable transmission, via the gate circuits, of a PWM drive signal supplied by a PWM circuit PWM-REG. PWM-REG supplies a high frequency pulse width modulated signal whose modulation permits regulation of the DC voltage supplied at the inputs $V_{DC}-$ and $V_{DC}+$ by the power switches $Q_2$ and $Q_1$, respectively. The regulated output voltage difference, between the two output terminals INNER and OUTER, is defined as the voltage of the inner sheath of the co-axial cable minus the voltage of the outer sheath of the co-axial cable.

The immediate lead to be energized is a co-axial cable to which an INNER output lead and an OUTER output lead is connected to the inner and outer sheath of the co-axial cable, respectively. The source of the switch $Q_1$ and the drain of the switch $Q_2$ are connected to the INNER output lead via the filter/isolation inductors $L_1$ and $L_2$ respectively. The source of switch $Q_2$ is also connected to the source of switch $Q_4$ and the drain of switch $Q_1$ is connected to the drain of $Q_3$. The common node N of the source of switch $Q_3$ and the drain of switch $Q_4$ is connected to the OUTER output lead connected to the outer sheath of the co-axial cable.

In operation the polarity switch responds to the alternating PHASE-A and PHASE-B signals to generate an alternating polarity trapezoidal waveform applied to the output co-axial cable. The switches $Q_3$ and $Q_4$ alternately connect the OUTER lead to the $V_{DC}+$ and $V_{DC}-$ voltages, respectively. The switches $Q_1$ and $Q_2$ operate at the PWM frequency and in conjunction with $L_1$ and $L_2$ operate as buck regulators to regulate the voltage applied by the INNER output lead to the inner sheath of the co-axial cable. During PHASE-A the FET switch $Q_2$ is modulated at the PWM frequency, applied via gate GA, with a controlled duty cycle to act as a buck regulator and supply a regulated negative voltage to the INNER output $Q_3$ connects $V_{DC}+$ to the OUTER output lead. CR2 acts as a clamp diode for the buck regulator and conducts when $Q_2$ is off. $L_2$ acts as the buck regulator choke. When PHASE-B occurs the outer sheath of the co-axial cable is connected via the OUTER output lead and $Q_4$ to the voltage $V_{DC}-$. $Q_1$, CR1 and inductor $L_1$ operate as a buck regulator to supply a regulated positive voltage to the INNER output lead and in turn the inner sheath of the co-axial cable. $Q_1$ is modulated by the PWM drive supplied through the gate GB. $Q_1$ source is isolated from $Q_2$ drain by the two separate buck regulator chokes, $L_1$ and $L_2$ to insure that high speed diodes CR1 and CR2 clamp the currents of $Q_1$ and $Q_2$ respectively upon turn off; and not allow the slow drain to source diodes inherent in $Q_1$ and $Q_2$, to facilitate a cross-connect. The faster diodes improve efficiency and reduce EMI. Also, the two inductors serve to isolate $Q_1$ from $Q_2$, so that if they are both on simultaneously for a short period, large destructive currents do not flow.

When PHASE-A is activated the outer sheath of the co-axial cable is connected to the $V_{DC}+$ voltage through $Q_3$. When the PHASE-B is activated the outer sheath of the co-axial cable is connected to the $V_{DC}-$ voltage. $Q_3$ and $Q_4$ are alternately driven conducting in phase with the alternation of the PHASE-A and PHASE-B states. $Q_1$ and $Q_2$ are driven by the PWM pulse series to provide regulation of the voltage supplied to the co-axial cable.

Figure 2:
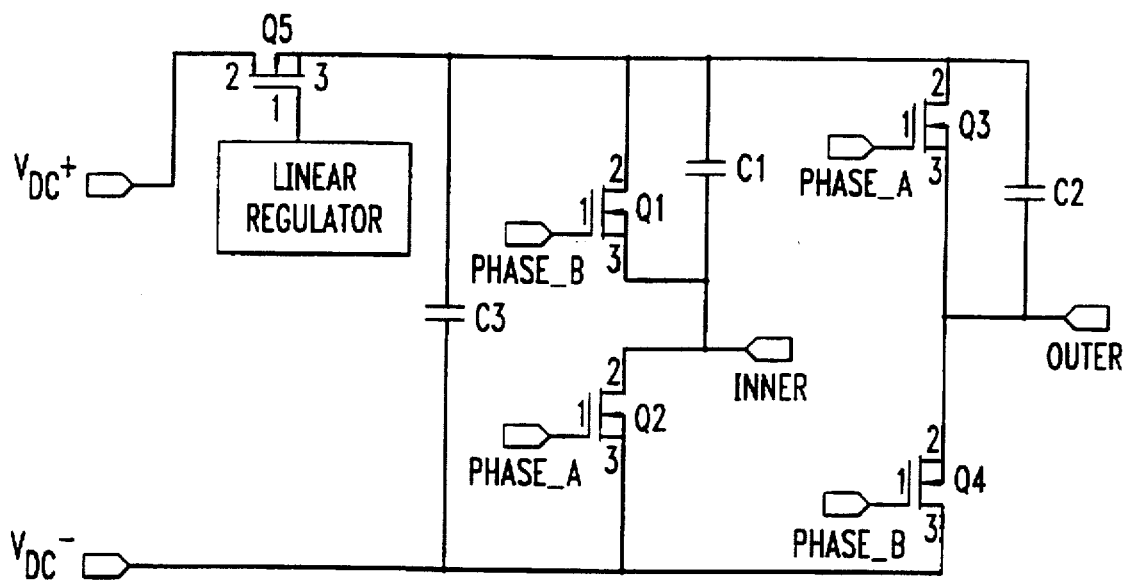
FIG. 2 is a schematic of a polarity switch following a regulator.
Figure 3:
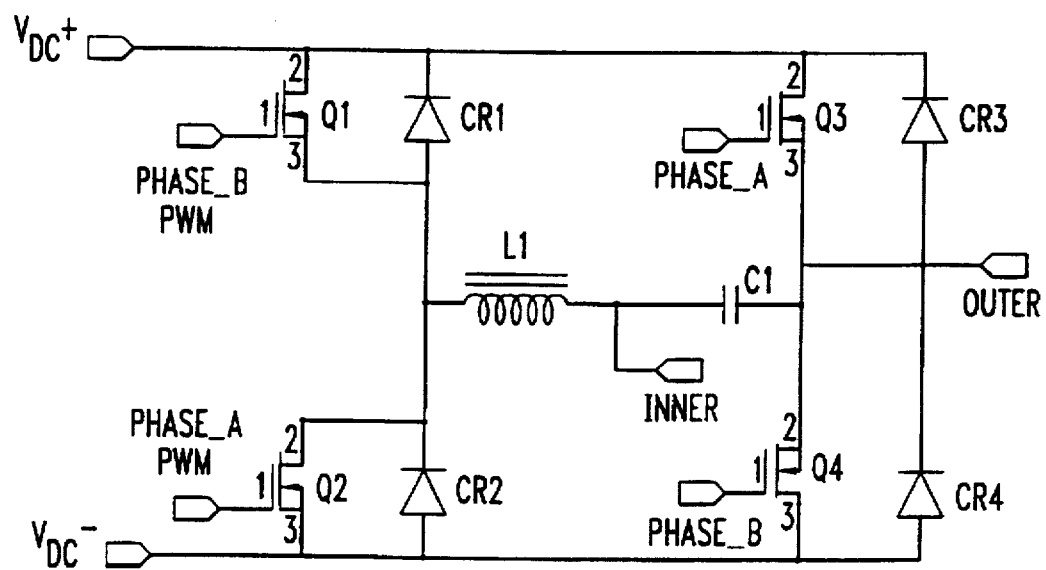
FIG. 3 is a schematic of a prior art full bridge inverter type polarity switch, discussed above.

A linear regulator LR is provided at the input to the voltage polarity switching circuit of FIG. 2. This eliminates the need for the gates GA and GB shown in the circuit of FIG. 1. The power train comprising FET switches $Q_1$, $Q_2$, $Q_3$ and $Q_4$ is similar to that of the circuit of FIG. 1 except that the pre regulator LR is connected to the input hence relieving the FET switches $Q_1$ and $Q_2$ from the responsibility of regulation. The regulator LR may be comprised of any type regulator switching, series etc. The requirements of size and efficiency, however, generally require the use of a switching type regulator.

The invention claimed is:

1. A voltage polarity switch for converting a DC voltage to a low frequency AC voltage comprising:

an input having terminals for accepting positive and negative polarities of a DC voltage, respectively;

an inner and an outer output for coupling to an inner and an outer member of a co-axial cable, respectively;

a first, a second, a third and a fourth power switching device, wherein the first and the third switching devices each have a main conduction path connected to a first polarity of the DC voltage and the second and the fourth power switching device each have a main conduction path connected to a second polarity of the DC voltage, further wherein the first and the second power switching devices each have their main conduction path connected to the inner output and the third and the fourth power switching devices each have their main conduction path connected to the outer output; and means for regulating a voltage difference between the inner and the outer member of the co-axial cable.

2. A voltage polarity switch, as claimed in claim 1: wherein the means for regulating comprises, first and second gates alternately enabled by PHASE-A and PHASE-B and each first and second gate coupling it PWM regulation signal to the second and first power switching devices respectively.

3. A voltage polarity switch, as claimed in claim 2, wherein the first and second switches are connected to a first and second inductor, respectively to form first and second buck regulating circuits.

4. A voltage polarity switch, as claimed in claim 1: wherein the means for regulating comprises, a regulating circuit connected in the input.

5. A voltage polarity switch, as claimed in claim 1: wherein the means for regulating comprises, means for applying a PWM regulation signal to the second and third power switching devices during a PHASE-A interval and to the first and fourth power switching devices during a PHASE-B interval.

6. A voltage polarity switch, as claimed in claim 1 further comprising a first clamping diode connected between the first power switching device and the negative polarity input terminal and a second clamping diode connected between the second power switching device and the positive polarity input terminal.

7. A voltage polarity switch, as claimed in claim 1 wherein, a first and a second inductor are connected to the first and the second power switching devices respectively for preventing cross conduction therebetween.

8. A voltage polarity switch for converting a DC voltage to a low frequency AC voltage comprising:

an input having terminals for accepting positive and negative polarities of a DC voltage, respectively;

an inner and an outer output for coupling to an inner and an outer member of a co-axial cable, respectively;

a first, a second, a third and a fourth power switching device, wherein the first and the third switches each have a main conduction path connected to a first polarity of the DC voltage and the second and the fourth switches each have a main conduction path connected to a second polarity of the DC voltage, further wherein the first and the second power switching devices each have their main conduction path connected to the inner output and the third and the fourth power switching devices each have their main conduction path connected to the outer output;

a first clamping diode connected between the first power switching device and the negative polarity input terminal and a second clamping diode connected between the second power switching device and a positive polarity input terminal;

a first and a second inductor connected to the first and the second power switching devices, respectively, for preventing cross conduction therebetween; and means for regulating a voltage difference between the inner and the outer member of the co-axial cable, including:

means for applying a PWM regulation signal to the second and the third power switching devices during a PHASE-A interval and to the first and the fourth power switching devices during a PHASE-B interval.

* * * * *